(12) United States Patent
Korshunov et al.

(10) Patent No.: US 9,703,800 B1
(45) Date of Patent: Jul. 11, 2017

(54) METHOD AND SYSTEM FOR CALCULATING CHANGES FOR A LARGE DATA SET

(71) Applicant: EMC Corporation, Hopkinton, MA (US)

(72) Inventors: Dmitrii Korshunov, Pleasanton, CA (US); Shu-Shang Sam Wei, Danville, CA (US); Linda Wong, Dublin, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 705 days.

(21) Appl. No.: 13/926,654

(22) Filed: Jun. 25, 2013

(51) Int. Cl.
*G06F 17/00* (2006.01)
*G06F 17/30* (2006.01)

(52) U.S. Cl.
CPC .............................. *G06F 17/30174* (2013.01)

(58) Field of Classification Search
CPC ............. G06F 11/1464; G06F 2201/84; G06F 17/30088; G06F 9/45558; G06F 11/1435
See application file for complete search history.

(56) References Cited

U.S. PATENT DOCUMENTS

| | | | |
|---|---|---|---|
| 2005/0267945 A1* | 12/2005 | Cohen | G06F 21/10 709/215 |
| 2009/0138442 A1* | 5/2009 | Ku | G09B 5/00 |
| 2010/0106685 A1* | 4/2010 | Ott | G06F 17/30176 707/611 |

* cited by examiner

*Primary Examiner* — Truong Vo
(74) *Attorney, Agent, or Firm* — Dergosits & Noah LLP; Todd A. Noah (57) ABSTRACT

A method and system for sharing and synchronizing content between a content repository and a file sharing service. A connector engine is configured between the content repository and the file sharing service. A new snapshot of the content repository is divided into smaller snapshots, and each smaller snapshot is paired and compared with the prior snapshot to identify new and changed objects. Likewise, the prior snapshot is divided into smaller snapshots, and each smaller snapshot is paired and compared with the new snapshot to identify deleted objects.

20 Claims, 11 Drawing Sheets

|    | Storage One | Storage Two | Collision | Resolution |
| --- | --- | --- | --- | --- |
| 1 | Content changed | Content changed | Yes | TBD |
| 2 | Ancestor folder deleted / Ancestor folder is no more in Shared folder | Content changed | Yes | TBD |
| 3 | Ancestor folder deleted / Ancestor folder is no more in Shared folder | File/Folder moved inside the ancestor folder | No | Delete ancestor folder (ignore move because the moved file/folder will be deleted) |
| 4 | Ancestor folder deleted / Ancestor folder is no more in Shared folder | File/Folder moved outside the ancestor folder | No | perform the move first |
| 5 | Ancestor folder deleted / Ancestor folder is no more in Shared folder | File/Folder renamed | No | Delete ancestor folder (ignore rename) |
| 6 | Ancestor folder deleted / Ancestor folder is no more in Shared folder | File/Folder deleted | No | Delete ancestor folder (ignore delete) |
| 7 | File/Folder deleted or is no more in Shared folder | File/Folder moved | Yes | TBD |
| 8 | Folder deleted | File moved-in or added | Yes | TBD |
| 9 | Folder moved | File deleted | No | Need to use id to identify file |
| 10 | File/Folder deleted or is no more in Shared folder | File/Folder renamed | Yes | TBD |
| 11 | File/Folder deleted or is no more in Shared folder | File/Folder deleted | No | No op (do we need to delete from Syncplicity recycle bin?) |
| 12 | File deleted or is no more in Shared folder | Content changed | Yes | TBD |
| 13 | File moved to a different location within Share | Content changed | No | Apply each event to the other side |
| 14 | File linked to a different location within Share (i.e. create new mapping) | Content changed | No | A link on DCTM creates a new instance on Syncplicity side. Hence, Syncplicity will have two copies. Need to update content first for performance reason. |
| 15 | File renamed | Content changed | No | Apply each event to the other side (assuming Syncplicity will implement Rename and Move) |
| 16 | File/Folder renamed | File/Folder renamed | Yes | TBD |
| 17 | File/Folder moved to a different location | File/Folder moved to a different location | Yes | TBD |

FIG.3

- Task id – a unique task identifier
- Mapping id – identifier of object mapping
- Object type – File or Folder
- Operation – Add, Delete, Update, Rename, Move
- Source id – identifies the source storage of changes (e.g. DCTM or Syncplicity)
- Source object id – object identifier in the source storage
- Destination id – identifies the target storage (e.g. DCTM or Syncplicity)
- Destination object id – object identifier in the source storage, might be null for Add operation
- Status – the current status of the task: Awaiting (not queued yet, for nested tasks), Queued, InProgress, Completed
- Result – task execution result (Success, Failure, Collision)
- Depends on – task id which this task depends on, i.e. cannot be started before that task is completed. For instance, task for adding a new document may depend on the task for adding new parent folder; or, subsequent task for update file content will depend on the previous task for adding the same file.

FIG. 4

| # | Task operation | Destination object | Task result (Collision/Failure/Success) | Resolution |
|---|---|---|---|---|
| 1 | File Update (Content changed) | Content changed | Collision | TBD |
| 2 | File/Folder delete | User doesn't have enough permissions | Collision | TBD |
| 3 | File/Folder create | User doesn't have enough permissions | Collision | TBD |
| 4 | File/Folder rename | User doesn't have enough permissions | Collision | TBD |
| 5 | File/Folder move | User doesn't have enough permissions | Collision | TBD |
| 6 | File Update (Content changed) | User doesn't have enough permissions | Collision | TBD |
| 7 | File Update (Content changed) | File is locked | Collision | TBD |
| 8 | File Delete/move (Content deleted) | File is locked | Collision | TBD |
| 9 | File Update (Content changed) | Ancestor folder deleted | Collision | TBD |
| 10 | File Update (Content changed) | File deleted | Collision | TBD |
| 11 | File Update (Content changed) | File renamed | Success | |
| 12 | File/Folder create | Ancestor folder deleted | Collision | TBD |
| 13 | File/Folder rename | File/Folder renamed | Success | TBD |
| 14 | File/Folder rename | File/Folder deleted | Success | File/Folder deleted |
| 15 | File/Folder delete | File/Folder renamed | Success? | File/Folder deleted |
| 16 | File/Folder move | File/Folder moved | Success | TBD |
| 17 | File/Folder delete | File/Folder moved | Success | File/Folder deleted |
| 18 | Folder delete | Child file is locked | Collision | TBD |
| 19 | Any | Failed to apply changes for any other reason | Failure | Return and log error message. May retry depending on the nature of the action/failure |

FIG. 5

| EMC_SYNC_MAPPINGS | | |
|---|---|---|
| Name | Type | Comments |
| mapping_id | BIGINT IDENTITY | Primary key |
| repo_obj_id | varchar | Repository object id. (i_chronicle_id for DCTM) |
| repo_obj_path | varchar(2000) | Repository object path relative to the shared folder. |
| repo_obj_name | varchar(512) | Repository object name. |
| repo_obj_modstamp | varchar | Repository object modification stamp. (i_content_id for DCTM files; NULL for folders???) |
| syncp_obj_id | BIGINT | Syncplicity object id |
| syncp_obj_path | varchar(2000) | Syncplicity object virtual path |
| syncp_obj_name | varchar(512) | Syncplicity object name |
| syncp_obj_modstamp | BIGINT | Syncplicity' LatestVersionId (64-bit) of a file; 0 – for folder |
| obj_type | Integer | 1 – folder, 2 - file |
| syncpoint_id | BIGINT | Syncpoint id from EMC_SYNC_SYNCPOINTS |
| excluded | SMALLINT | 0 – included in sync (default); 1 – excluded |
| parent_mapping_id | BIGINT | Parent mapping. |

FIG. 6A

| EMC_SYNC_SYNCPOINTS | | |
|---|---|---|
| Name | Type | Comments |
| syncpoint_id | BIGINT IDENTITY | Primary key. The unique id of the sync point |
| syncpoint_name | varchar (256) | The name of the Syncplicity Folder |
| mapping_id | BIGINT | Mapping that represents shared folder in repository and corresponding Syncplicity root folder |
| repository_name | varchar(256) | Repository name the shared folder belongs to. |

FIG. 6B

| EMC_SYNC_REPO_SNAPSHOTS | | |
|---|---|---|
| Name | Type | Comments |
| share_id | BIGINT | The unique id of the shared folder. |
| obj_id | varchar | Repository object id. (i_chronicle_id for DCTM) |
| obj_name | varchar(512) | Repository object name. |
| obj_modstamp | varchar | Repository object modification stamp. (i_content_id for DCTM files; NULL for folders???) |
| obj_parents | varchar | List of object parents represented by their ids |
| obj_type | Integer | 1 – folder, 2 - file |

FIG. 6C

| EMC_SYNC_SYNCPLICITY_NEWS_FEEDS | | |
|---|---|---|
| Name | Type | Comments |
| syncpoint_id | BIGINT | The unique id of the sync point. |
| news_feed_date | DATE | The time when news feed were read. |

METHOD AND SYSTEM FOR CALCULATING CHANGES FOR A LARGE DATA SET

CROSS-REFERENCE TO RELATED APPLICATIONS

This disclosure relates to U.S. application Ser. No. 13/799,075, filed Mar. 13, 2013, entitled Method and System for Connecting a Content Repository to a File Sharing Service, the entire disclosure of which is incorporated by reference herein.

TECHNICAL FIELD

This disclosure relates generally to the field of content sharing and synchronization, and more particularly, to systems and methods for synchronizing content shared among multiple computing devices using parallel threading and queueing of data.

BACKGROUND

Content repositories and enterprise content management ("ECM") systems, such as the Documentum® content management platform, are multi-user environments, where many users are able to access the same repository at the same time. In contrast, file sharing and synchronization services, such as the Syncplicity® platform, are single-user systems, where a single user may have multiple computing devices all sharing the same content, as managed by the file service. This disparity can create complexities when trying to map content from a repository to a file sharing service. For example, since multiple users are able to create/update/rename/delete files and folders at the same time in an ECM system, keeping track of changes and synchronizing content in such an environment is difficult and processing intensive. It would thus be desirable to provide an efficient mechanism for keeping track of changes and synchronizing content when file sharing and synchronization services are integrated with repository services.

BRIEF DESCRIPTION OF THE DRAWINGS

FIG. 3 is a table illustrating all possible combinations of changes to content.

DETAILED DESCRIPTION

1. Overview

This disclosure describes a connector that is configured to enable sharing and synchronization of content between a data repository, such as the Documentum® content management platform, and a file sharing/synchronization service, such as the Syncplicity® service. The connector allows content in the repository to be shared and synchronized with all computing devices that are linked through the file sharing and synchronization service. Further, changes to content in the repository may be identified and analyzed by comparing a new snapshot to the prior snapshot. The new snapshot is divided into smaller snapshots, and each smaller snapshot is paired with the prior snapshot to find new and changed objects. Similarly, the prior snapshot is divided into smaller snapshots, and each smaller snapshot is paired with the new snapshot to find deleted objects.

2. Terminology

The following terminology is used in this disclosure:

"Syncplicity" is a Cloud-based service for synchronizing and sharing files among computers and mobile devices.

"Orchestration Layer" is the computing layer provided by the Syncplicity service to handle content synchronization among all sync points and corresponding endpoints.

"Syncplicity Syncpoint"—abbreviated as Syncpoint—is a virtual root directory where the synchronization process between the Syncplicity service and other computer devices starts.

"Syncplicity Endpoint"—abbreviated as Endpoint—is a computing device, e.g., a personal computer or a mobile device.

"Documentum"—abbreviated as DCTM or DCTM repository—is an enterprise content management platform.

"Connector Engine"—abbreviated as CE—is a platform-independent framework that is the primary processing interface between the DCTM repository and the Syncplicity service.

"Connector Agent for Documentum"—abbreviated as DCTM connector—is a component running inside an Application Server configured to publish contents stored in Documentum repositories to the Syncplicity service, and to provide access to content stored in the Documentum repository in order to coordinate synchronization of content by the Connector Engine for all computing devices associated with the same sync point.

"DCTM Publish Folder"—abbreviated as Publish Folder—is a folder in the Documentum repository whose contents (directly and indirectly underneath the folder) get pushed only from the Documentum repository to the Syncplicity service, and not in the other direction.

"DCTM Collaboration Folder"—abbreviated as Collaboration Folder—is a folder whose contents (directly and indirectly underneath the folder) are synchronized from both directions.

"Shared folder" is a folder within a repository selected for either publishing or collaboration.

"Connector Installer" is an installer which deploys the DCTM connector to an Application Server, associates the DCTM connector with a DCTM repository, and records the Syncplicity Administrator account as a service account.

"Connector Administrator" is a graphic user interface ("GUI") tool which allows the administrator to share a Publish Folder or a Collaboration Folder in the DCTM repository, and to populate the recipients list to the respective Syncpoint. The GUI also sets rules for uploading and downloading contents.

3. Integrating Synchronization with Content Management

Figure 1:
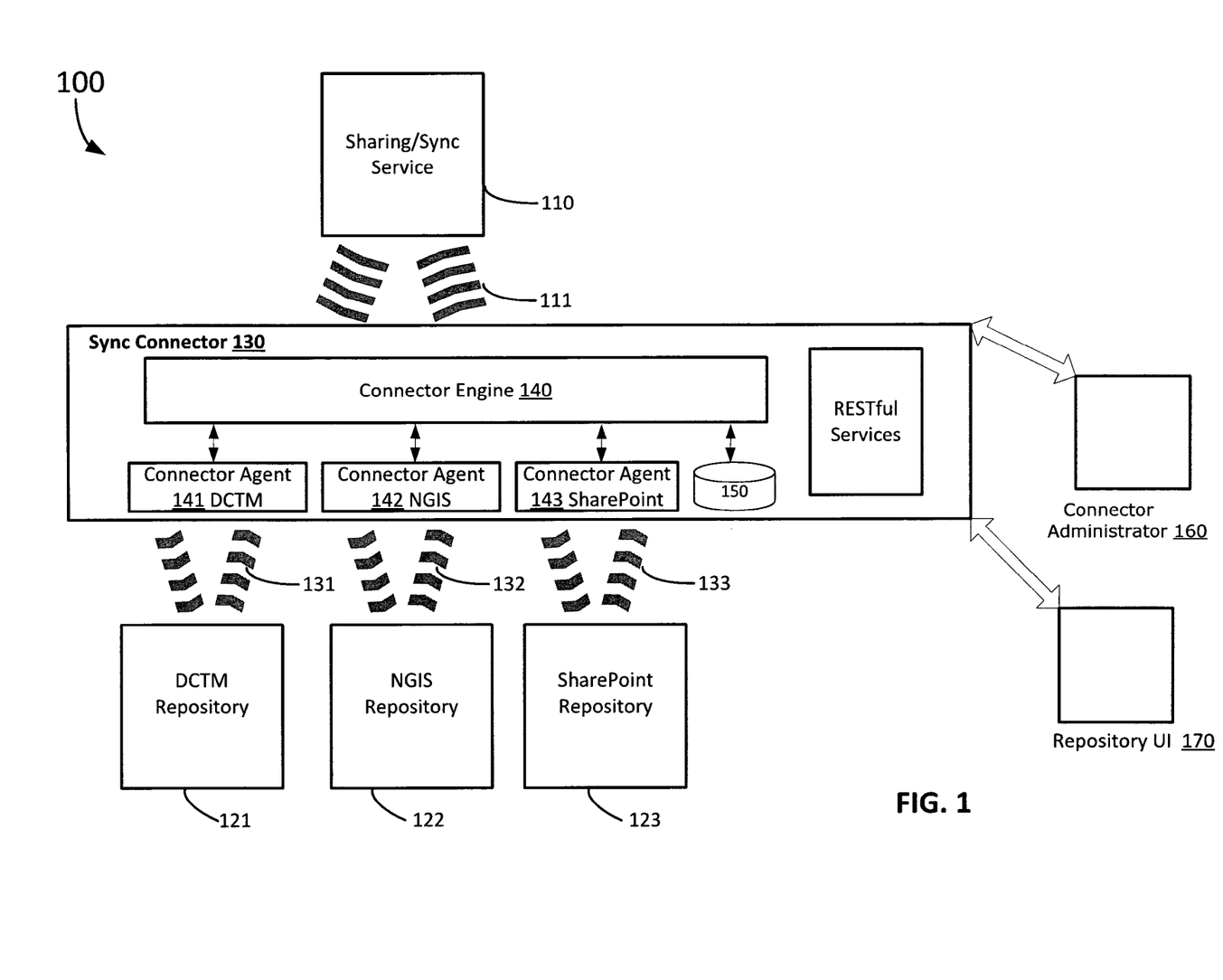
FIG. 1 is block diagram of an integrated system for content sharing and synchronization between a single-user content sharing and synchronization service and a multi-user content management service.

Referring to FIG. 1, an embodiment of a networked environment 100 is illustrated that includes a file sharing/synchronization service 110 ("sharing/sync service"), multiple content repositories 121, 122, 123, and a connector 130 that provides an interface between the sharing/sync service and the content repositories. The connector 130 listens for changes to content on the sharing/sync service 110 or any of the repositories 121, 122, 123, and coordinates downloads to the repositories and uploads to the sharing/sync service to provide synchronized content.

Although three content repositories 121, 122, 123 are shown, the example is merely illustrative as there could be more or fewer repositories actually coupled to the connector 130. For example, the sharing/sync service 110 may be a single user web-based service, such as the Syncplicity file sharing and synchronization service, that allows folders and files to be identified, shared and synchronized among all computing devices of the user, without moving the files. Likewise, the repositories may be any repository service, such as the Documentum content management platform; the Sharepoint content management platform; a Next Generation Information Server ("NGIS") platform; or a Network Attached Storage ("NAS") platform, such as Atmos and Isilon. The examples described below are based on connecting the Documentum repository platform with the Syncplicity service. However, it should be recognized that other platforms can be similarly integrated through suitable instruction programming. Each repository 121, 122, 123 is coupled to the connector 130 via a respective communications link 131, 132, 133, and the file sharing service 110 is coupled to the connector via communication link 111.

The components shown in FIG. 1 may be implemented with conventional computing devices configured in well known manner, e.g., by providing executable instructions to the computing devices for performing their respective functional operations and for communicating and interacting with each other.

The connector 130 is preferably implemented as an instance of an application server running between the file sharing service 110 and the repositories 121, 122, 123. The connector 130 therefore is preferably programmed with executable instructions designed to achieve two main objectives: (i) to publish content from the repositories to the file sharing service so that other computing devices connected to the file sharing service can share the content; and (ii) to coordinate changes made to content at either the file sharing service or the repository in order to synchronize the contents.

The connector 130 may be configured through a generic user interface (UI) 160, or in an alternative embodiment, via a repository-specific UI 170, as further described below. The connector 130 is preferably configured through UI 160, which acts as a connector administrator for configuring content sharing between the repositories 121, 122, 123 and the file sharing service 110. The UI 160 is configured to allow users, such as a system administrator, to (i) create profiles which define the credential mapping from repository users or groups to a file sharing service login account and filtering rules (based on object type, format, file size, and so on) for deciding what kinds of content to synchronize in and out; (ii) share a folder with an associated profile; and (iii) change the password for a credential in a file sharing service account, repository admin account, etc. Since the UI 160 is mainly driven by administrators based on company policy, operating in this mode is referred to herein as Auto Sharing or Implicit Sharing.

The connector 130 may also be configured through alternative UI 170, which is adapted for a particular repository platform and is suitable to configure the folders in that repository for sharing. For example, UI 170 may be a feature of the Documentum platform, e.g., D2 ver. 4.1 and/or xCP ver. 2.0. Such a client UI is driven by end users based on their own needs, and thus, operating in this mode is referred to herein as Manual Sharing or Explicit Sharing.

The connector 130 is configured to include a connector engine (CE) 140, which is a generic, platform-independent framework that serves as a bridge between the file sharing service 110 and the repository platforms 121, 122, 123. For example, CE 140 is programmed with executable instructions to (i) upload content from the repository to the file sharing service; (ii) store the synchronization status of each uploaded file and folder in a persistent store 150; (iii) monitor content changes on the file sharing service, and (iv) download changes from the file sharing service to the repository. The persistent store 150 may be the Apache Derby relational database management system, which is shipped with the DCTM platform, or another external database configured by users (such as Oracle or SQL Server, via setting a proper JDBC driver, URL and credential). The connector engine 130 is illustrated in more detail in FIG. 2, described below.

The connector 130 also includes connector agents 141, 142, 143, which are platform-specific modules used by the CE 140 to communicate with the corresponding repository platforms 121, 122, 123 regarding traversing folders, retrieving or saving content, monitoring changes, etc. For example, connector agent 141 may be programmed with executable instructions to (i) navigate the folder structure on the repository platform; (ii) upload content from the repository to the CE 140; (iii) download content from the CE to the repository; and (iv) record the synchronization status of each uploaded file and folder in the repository. The synchronization status may be used by clients to mark or decorate the corresponding object on the user interface.

Figure 2:
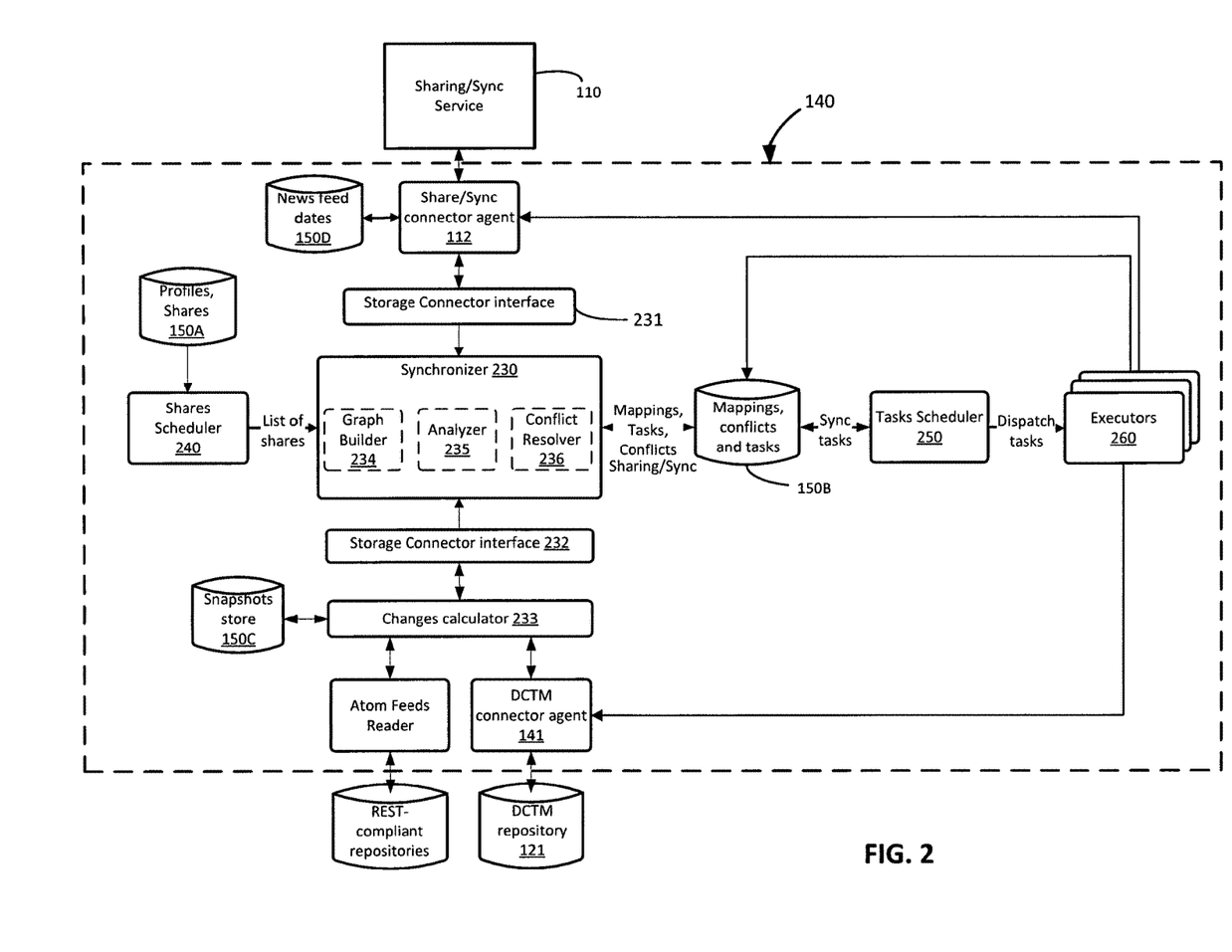
FIG. 2 is a block diagram illustrating the connector engine component of the system of FIG. 1 in more detail.

FIG. 2 illustrates the connector engine 140 in more detail. Database functions are typically provided by a centrally-located, integrated database structure that may be implemented using one or more dedicated processor-based servers, such as the Derby database, and are used for storing and retrieving relevant information including internal information required for synchronization. For example, in FIG. 1, the database 150 is shown schematically as being located internal to the connector 130, but it may also be located externally, or a combination thereof, depending upon needs and server allocation. In FIG. 2, the database 150 is shown logically as a number of different database functional units 150A-150D, which may be implemented in the single database 150, or in a combination of different databases.

Database functional unit 150A stores profiles which include connectivity information for the sharing/sync service 110 and rules for content publishing. Database functional unit 150A also stores "shares" which encapsulate a shared folder in one of the content repositories 121, 122, 123 and the corresponding folder in the sharing/sync service 110, as well as the corresponding profiles used to share the repository folders. Database functional unit 150B stores (i) mappings, which are pairs of objects from a repository and the sharing/sync service 110 that are synchronized by the connector engine 140; (ii) conflicts that describe collisions found by the sharing/sync service when analyzing changes;

and (iii) tasks which represent changes to be applied by the connector engine. Database functional unit 150C stores snapshots of repository objects of each shared folder used to calculate changes that occur in a repository. Database functional unit 150D stores the latest time when the news feeds were read from the sharing/sync service for each syncpoint.

A key component of the connector engine 140 is the synchronizer module 230, which analyzes changes that occur in the repositories 121, 122, 123 (although only repository 121 is shown in FIG. 2) and/or the sharing/sync service 110, and produces a list of synchronization tasks which describe the changes that the connector engine 140 has to apply.

The synchronizer 230 includes at least three sub-components. A graph builder module 234 is configured to build a graph of objects from existing mappings stored in the database 150B. An analyzer module 235 is configured to analyze the changes coming from the repositories 121, 122, 123 and/or the sharing/sync service 110 and to process the changes, and to identify any conflicts. A conflict resolver module 236 is configured to resolve the conflicts, if any, and to persist the unresolved conflicts into the database 203.

The changes that occur in the sharing/sync service 110 are retrieved into the synchronizer 230 via a connector agent 112 and a first unified storage connector interface 231. The changes that occur in the repository 121 are retrieved into the synchronizer 230 via a connector agent 141, a changes calculator 233, and a second unified storage connector interface 232.

The connector agent 112 for the sharing/sync service 110 provides the interface 231 for the sharing/sync service which allows objects to be manipulated in the cloud, and also retrieves the list of changes that occurred at a particular syncpoint. The connector agent 141 for the Documentum repository 121 provides the interface 232 that allows users to (a) retrieve the list of children objects recursively from a shared folder for calculating changes; (b) evaluate profile rules for publishing content; and (c) provide basic operations for manipulating of objects including creating/deleting/moving/renaming files and folders, and setting/getting file content. The changes calculator 233 is repository-agnostic component that can calculate changes that occur in a repository based on the list of objects, that is, a comparison of snapshots.

The analyzer module 235 accepts sets of changes from the repositories and/or the sharing/sync service. Each set of changes describes objects that are added, deleted and/or updated. The data structure used to describe a single change should preferably have (i) an object type (file or folder); (ii) a change type (add, delete, update); (iii) the source ID (to identify the source of changes, e.g., a unique string like "Syncplicity" or "Documentum" or "NGIS"); (iv) an object ID; and (v) a parent object ID; and (vi) a relative or virtual path.

The table shown on FIG. 3 describes all possible combinations of changes which may occur in shared storage systems during a graph analysis. Some of the changes may lead to conflicts (collisions) which the system must be programmed to resolve.

The shares scheduler module 240 is responsible for scheduling synchronization for each shared folder. The number of shared folders that the connector engine 140 can process simultaneously is configurable.

Figure 4:
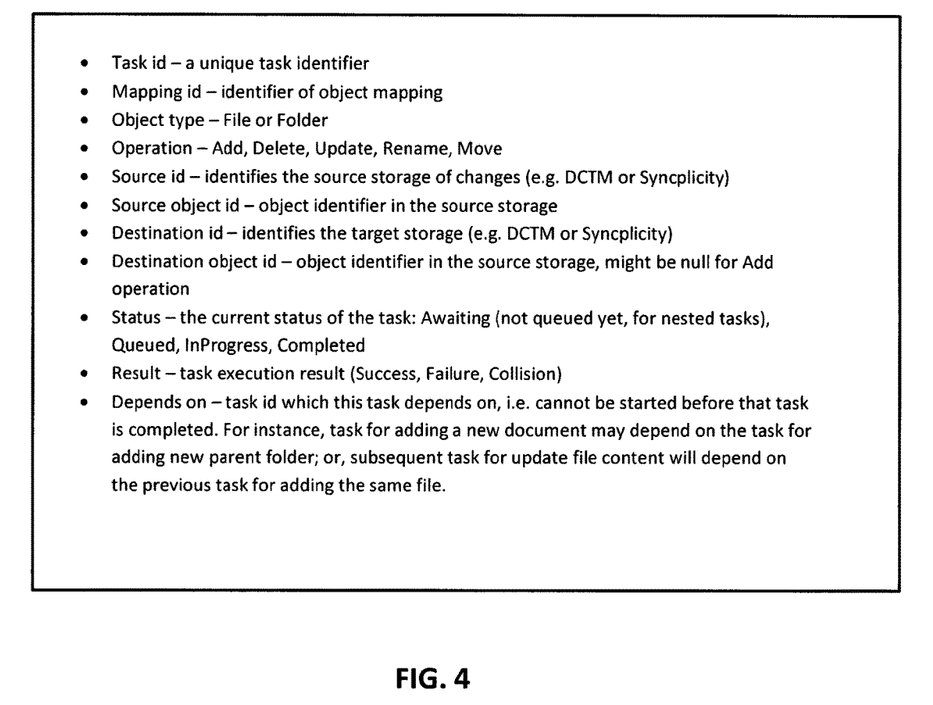
FIG. 4 is a block diagram illustrating the information that is tracked by the task scheduler component of FIG. 2.

The tasks scheduler module 250 schedules and dispatches tasks across a plurality of executor modules 260 (parallel tasks), and analyzes the result of task execution. For instance, if a task was completed successfully, all dependent tasks must be updated so they also can be picked up for execution, and therefore, the task scheduler 250 tracks each task execution for completion. The table shown in FIG. 4 represents and describes a typical data structure used to keep information about each task.

Figure 5:
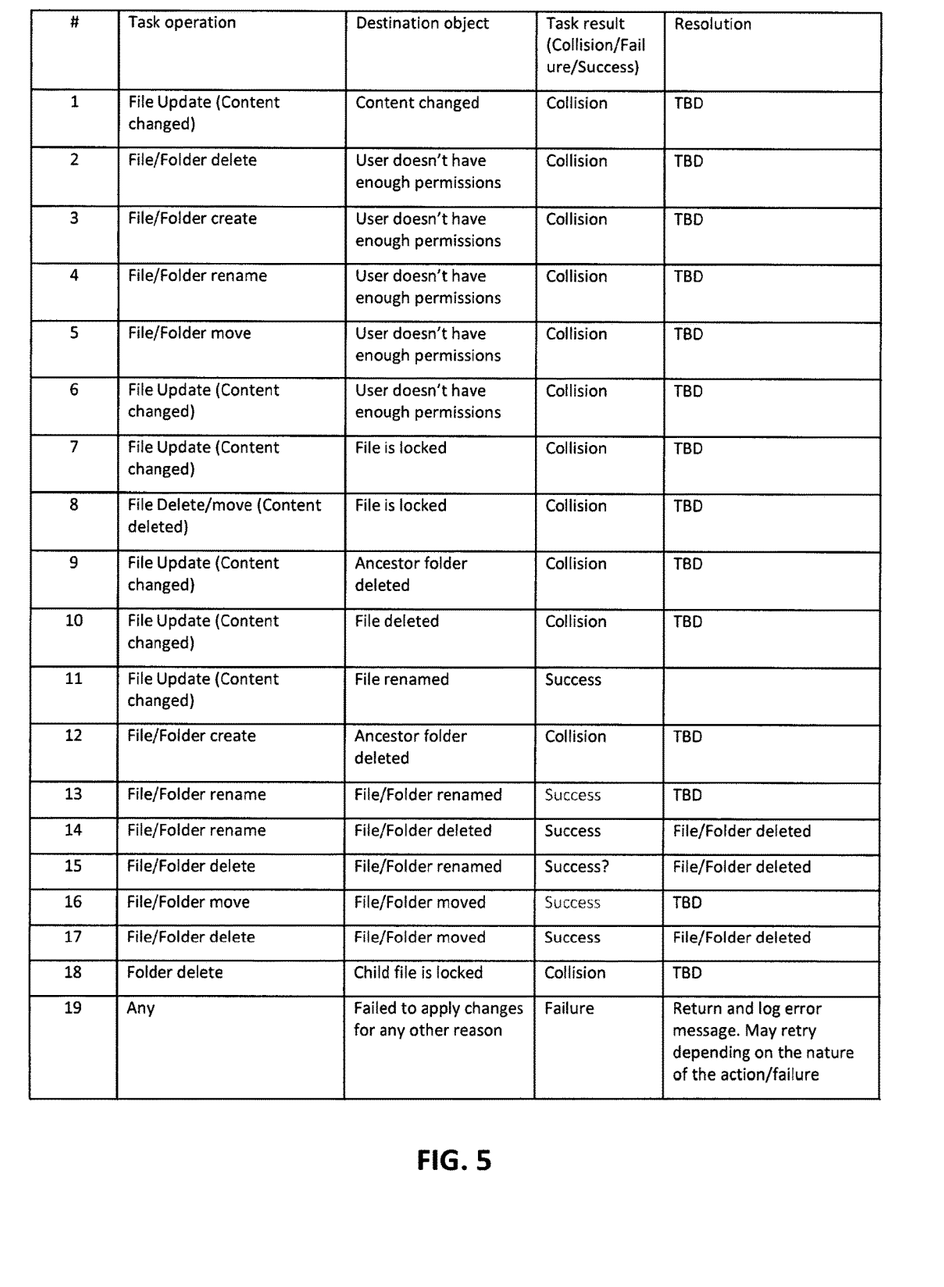
FIG. 5 is a table illustrating the failures/collisions that may occur when executing a task.

Finally, the executor modules 260 fulfill each task by applying changes to either the appropriate repository or the sharing/sync service. FIG. 5 illustrates a number of failures or collisions that can occur during task execution, for which a resolution may be programmed. The executor modules 260 also update mapping information and remove completed tasks from the database.

Figure 6A:
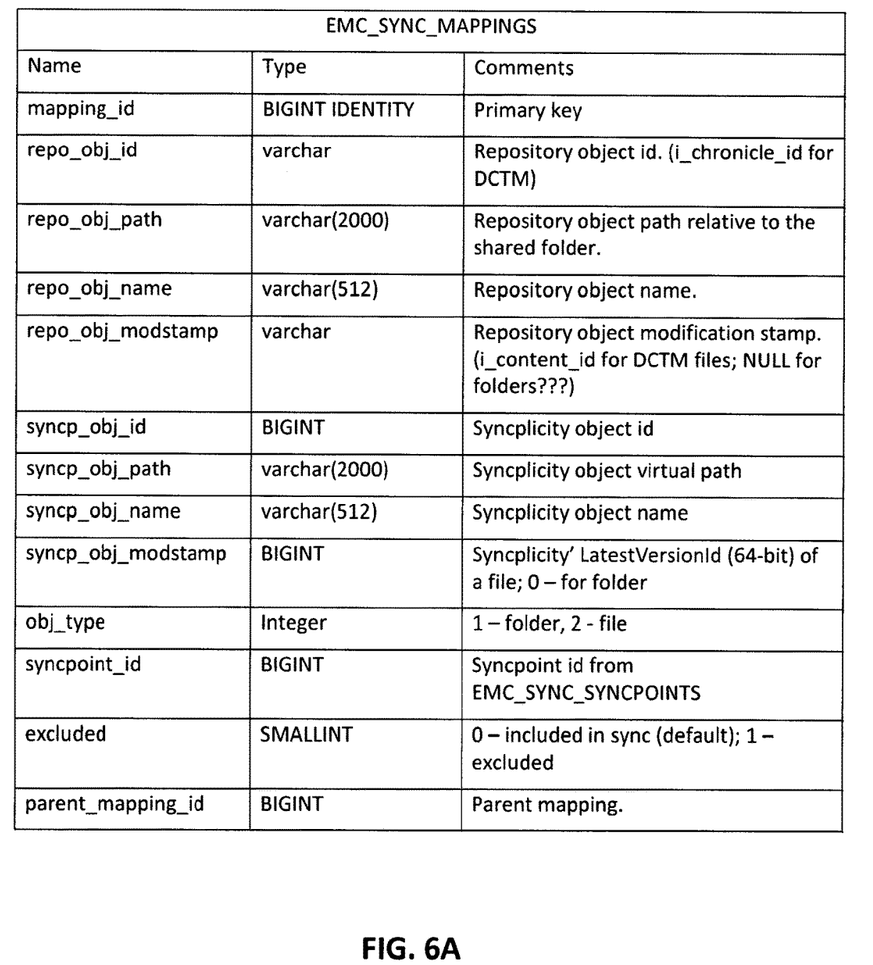
FIG. 6A illustrates objects used to identify mappings.
Figure 6B:
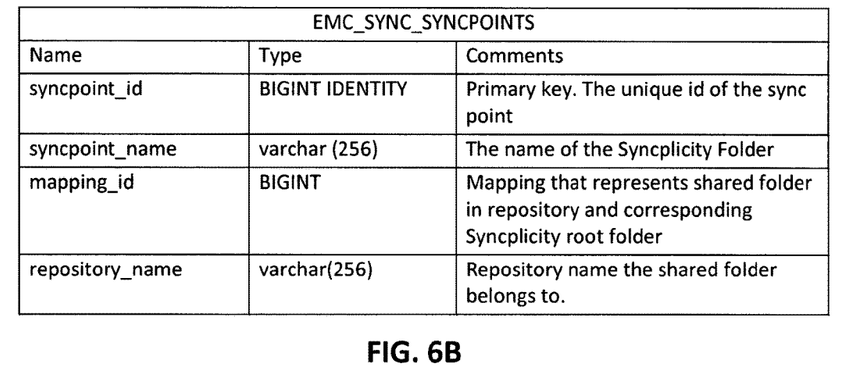
FIG. 6B illustrates objects used to identify syncpoints.
Figure 6C:
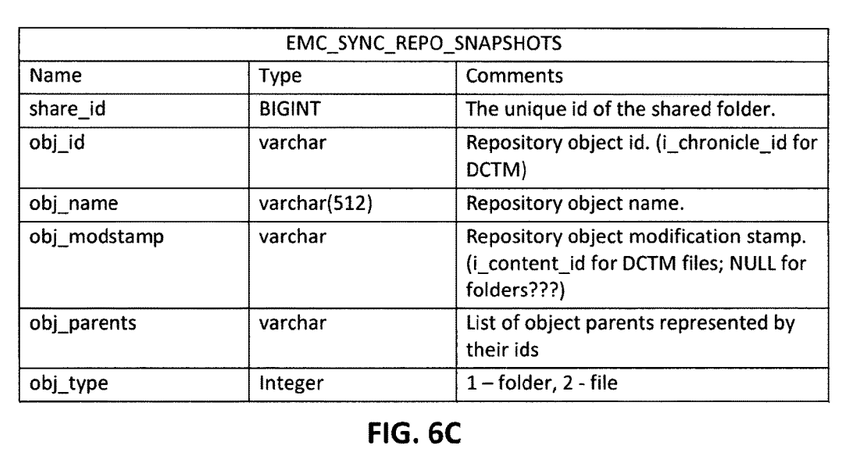
FIG. 6C illustrates objects used to identify snapshots.
Figure 6D:
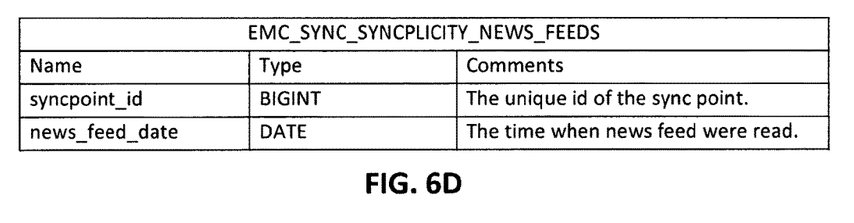
FIG. 6D illustrates objects used to identify news feeds.

FIGS. 6A-6D illustrate defined objects used for sharing and synchronizing contents between the Documentum platform and the Syncplicity sharing/sync service. For example, FIG. 6A shows objects used to store mappings; FIG. 6B shows objects used to store syncpoints; FIG. 6C shows objects used to store snapshots of the repository; and FIG. 6D shows objects used to store news feeds from the Syncplicity service.

4. Synchronization Process

Figure 7:
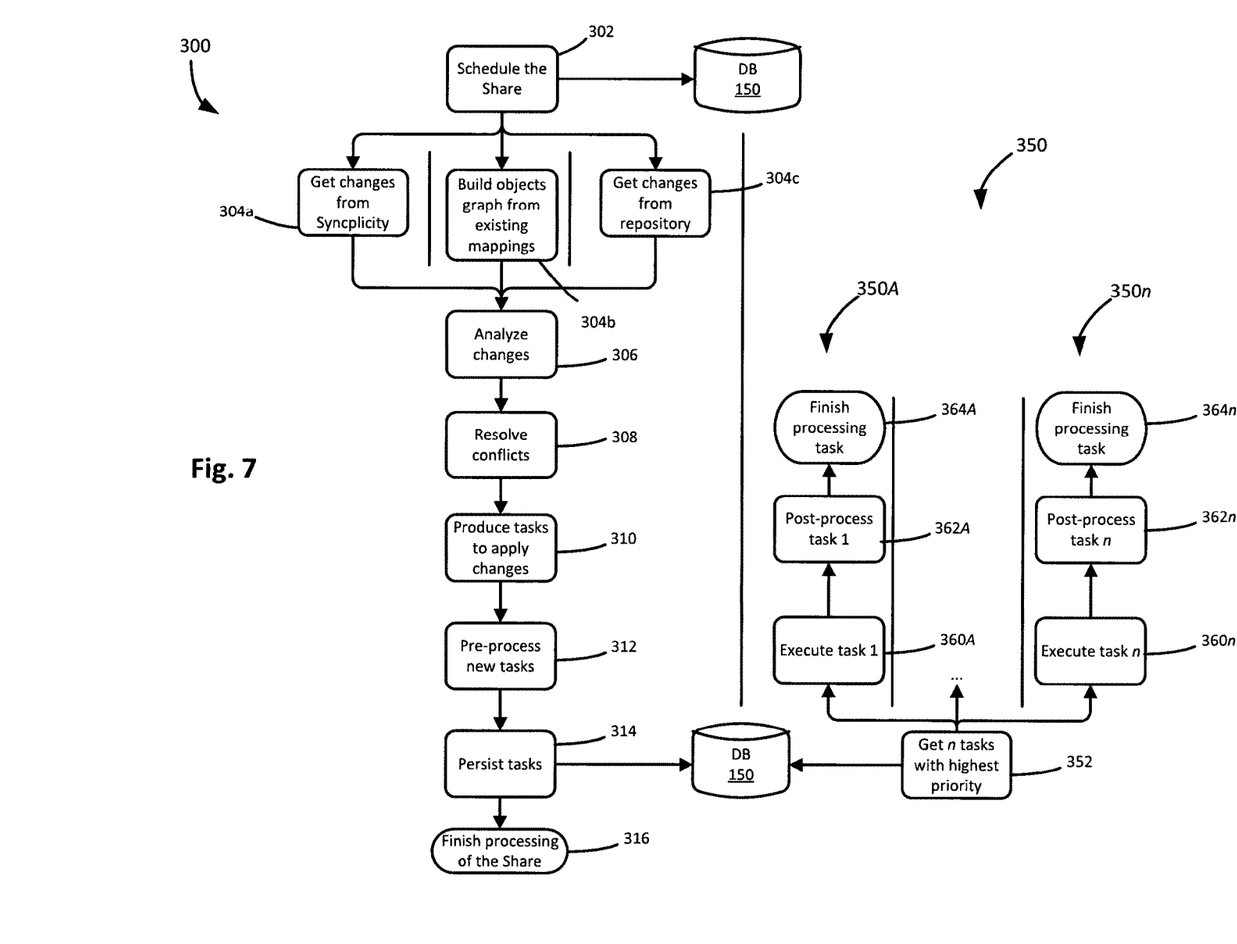
FIG. 7 is a block diagram illustrating a synchronization process.

FIG. 7 represents a high level illustration of a synchronization process having two distinct sub-processes 300 and 350. In step 302, each share is scheduled for synchronization. Each share is a pair of objects representing a repository folder and a syncpoint scheduled for synchronization at some defined frequency. The same share cannot be processed by multiple threads simultaneously. Thus, the processing of changes for a share, e.g., change analysis and generation of tasks, must be completed prior to the start of the next synchronization cycle for that same share.

Step 304 includes three steps for calculating changes that can be executed in parallel. In step 304a, changes are retrieved from the sharing/sync service. In step 304c, changes are retrieved from the repository. In step 304b, an objects graph is built from existing mappings stored in the database.

In step 306, the changes are analyzed by applying the changes from both the repository and the sharing/sync service to the objects graph. This will show any conflicts between changes in the corresponding storage locations. If collisions are detected, then they are resolved in step 308. Preferably, automatic resolution can be programmed for most conflicts. If automatic resolution cannot be accomplished, then the conflict is persisted into the database. Also, objects that belong to this share should be checked to see if they have resolved collisions, and therefore are ready to be synchronized in this cycle.

In step 310, for each object change which is not in conflict, a synchronization task for applying changes will be generated and assigned a priority. Some tasks may be dependent on other tasks. For instance, when adding a new folder with content, the folder must be synchronized first before any child object can be synched. In the case where a non-empty folder is deleted, it is enough to delete only parent folder object.

In step 312, new tasks are pre-processed. Thus, it is determined whether existing uncompleted tasks and new tasks refer the same objects. If so, then a check for possible conflicts between the tasks is performed or dependencies are set up between the tasks. If conflicts are found but cannot be auto-resolved, they are persisted into the database, and all queued and new tasks having conflicts are deleted. In step 314, pending tasks are persisted into the database 150. In step 316, the processing of the share via process 300 is completed, and the share can be picked up for processing again once tasks assigned to process 350 are completed.

Process 350 is comprised of a number of parallel threads 350A to 350n for handling task execution in parallel. In step 352, individual tasks are retrieved from the database 150 in priority order and assigned to a thread. Thus, the first or highest priority task can be assigned to thread 350A, the second or next highest priority task can be assigned to thread 350B (not shown), and so forth, up to n threads. Each thread performs identical processing for its assigned task. For example, in thread 350A, steps 360A, 362A and 364A are performed. In step 360A, the first task in thread 350A is executed. In step 362A, post-processing of the first task includes evaluating the result of task execution, which may affect execution of dependent tasks, or in the case of failure, the task may be re-executed. In the final processing step 364A, the synchronization task is removed from the table of uncompleted tasks and its information is recorded in an audit trail table.

Other threads are processed in the identical manner, e.g., for thread 350n, steps 360n, 362n and 364n are performed in the manner just described.

5. Calculating and Analyzing Changes

The calculation of changes that occur in a particular shared folder of a specific repository is based on a comparison of the previous snapshot P taken in the previous synchronization cycle with the new snapshot N taken in the current synchronization cycle. A snapshot is the set of all children of a shared repository folder taken recursively. The connector agent for the repository holds the snapshot of all children objects in two hash tables with the unique object ID, one for files and one for folders. After the comparison, the new snapshot N will replace the previous snapshot P.

The data stored for each object includes:
1. Object id;
2. Object name;
3. List of object parents;
4. Object modification stamp; and
5. Object type (file or folder).

In order to make the comparison of snapshots more efficient, a MapReduce programming model will be applied (separately for files and folders) to process the large amount of data in parallel. More specifically, a Map( ) procedure is run to perform filtering and sorting operations, then a Reduce( ) procedure is run to perform a summary operation. The application of the MapReduce model is illustrated in the block diagram of FIG. 8 as well as by process 500 in the flow chart of FIG. 9.

Figure 8:
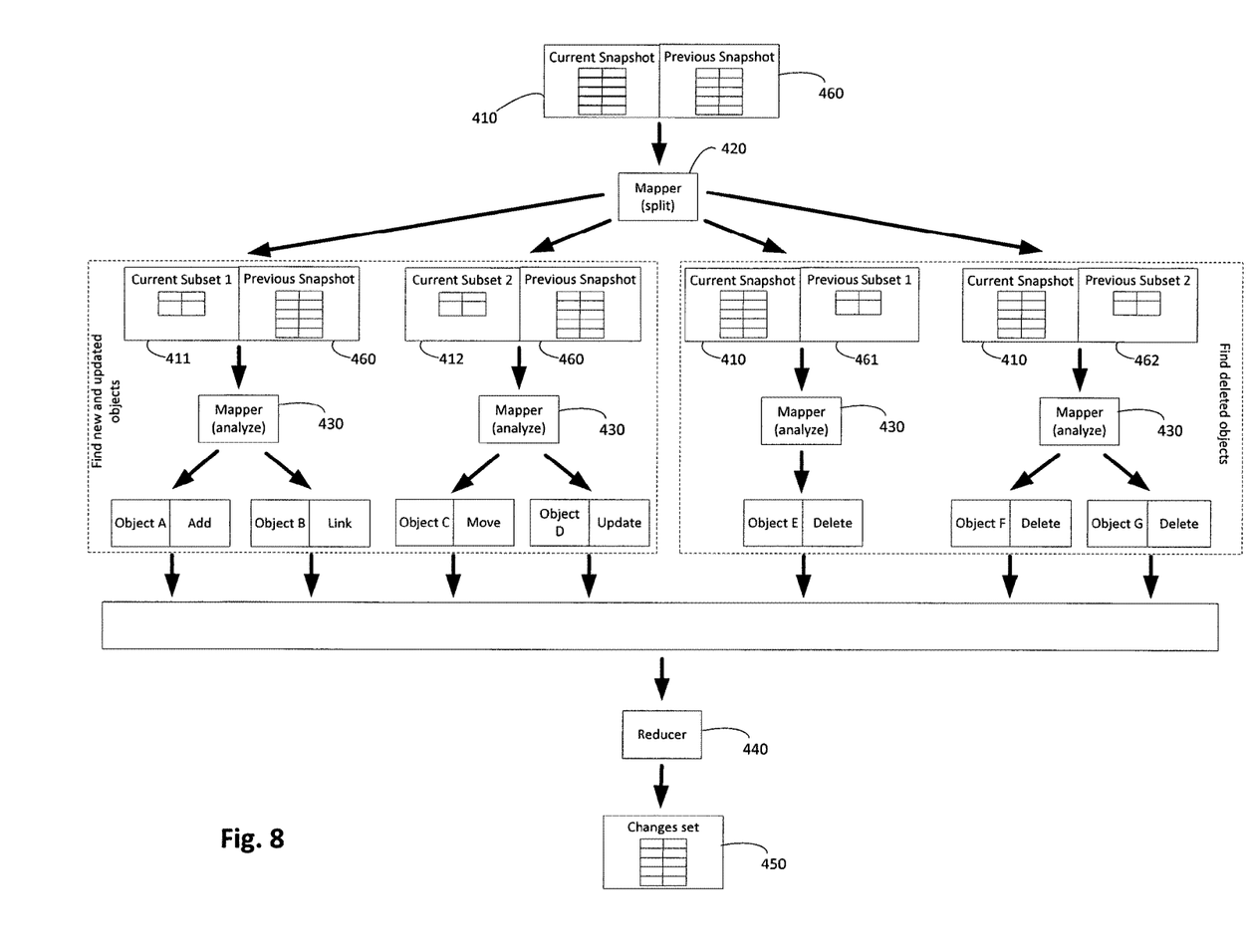
FIG. 8 is a block diagram illustrating mapping details of the synchronization process of FIG. 7.
Figure 9:
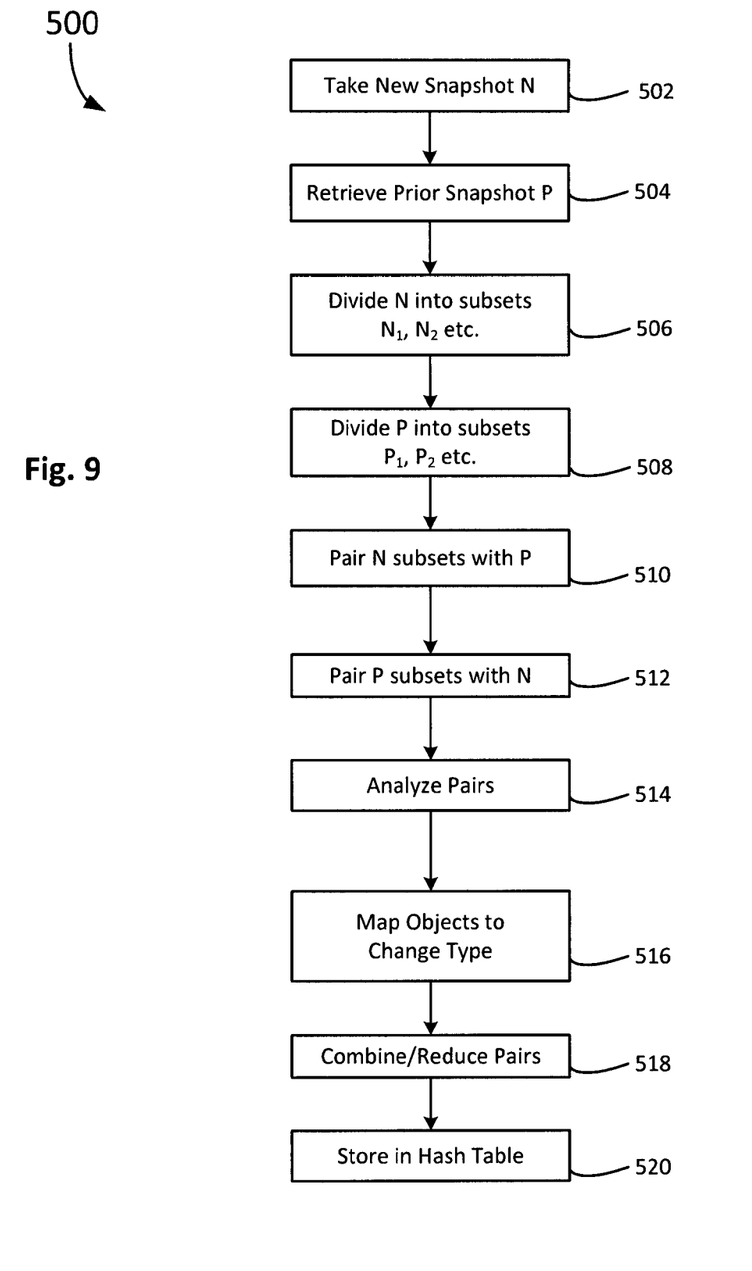
FIG. 9 is a flow chart illustrating the mapping details shown in FIG. 8.

In step 502, a new snapshot N of the repository is taken and placed into temporary storage 410. In step 504, the previous snapshot P is retrieved from the database and placed into temporary storage 460.

In step 506, the new snapshot N in storage 410 is mapped or divided into a number of smaller snapshots $N_1, N_2 \ldots N_k$ using a map function 420, each smaller snapshot having a subset of objects. For example, if the original snapshot has 1000 files, it may be mapped into 10 snapshots having 100 objects in each. Thus, in FIG. 8, smaller snapshot $N_1$ is placed into storage 411, smaller snapshot $N_2$ is placed into storage 412, and so on. Likewise, in step 508, the previous snapshot P is mapped or divided into a number of smaller snapshots $P_1, P_2 \ldots P_l$ using the map function 420, each smaller snapshot having a subset of objects. For example, in FIG. 8, smaller snapshot $P_1$ is placed into storage 461, smaller snapshot $P_2$ is placed into storage 462, and so on.

In step 510, each smaller subset of the new snapshot $N_1$, $N_2$, etc., is paired with the previous snapshot P to form a first set of pairs $(N_1, P), (N_2, P) \ldots (N_k, P)$. Similarly, in step 512, each smaller subset of the previous snapshot $P_1, P_2$, etc., is paired with the new snapshot N to form a second set of pairs $(P_1, N), (P_2, N) \ldots (P_l, N)$.

In step 514, each snapshot pair is analyzed for changes in parallel using a map function 430. In step 516, after determining the change to each object in the analysis step 514, the map function 430 generates a data pair having the object and the change type applied to that object. For example, as shown in FIG. 8, the map function 430 determines that Object A was added, Object B was linked, Object C was moved, Object D was updated, and Objects E, F and G were deleted.

In step 518, a reducer function 440 is applied to the object/change type pairs to combine or reduce all such pairs into a single hash table 450 that represents the set of changes, where the object ID is a key to the hash table and a list of changes is the value corresponding to the key. In step 520, the hash table 450 is stored into the database.

Figure 10:
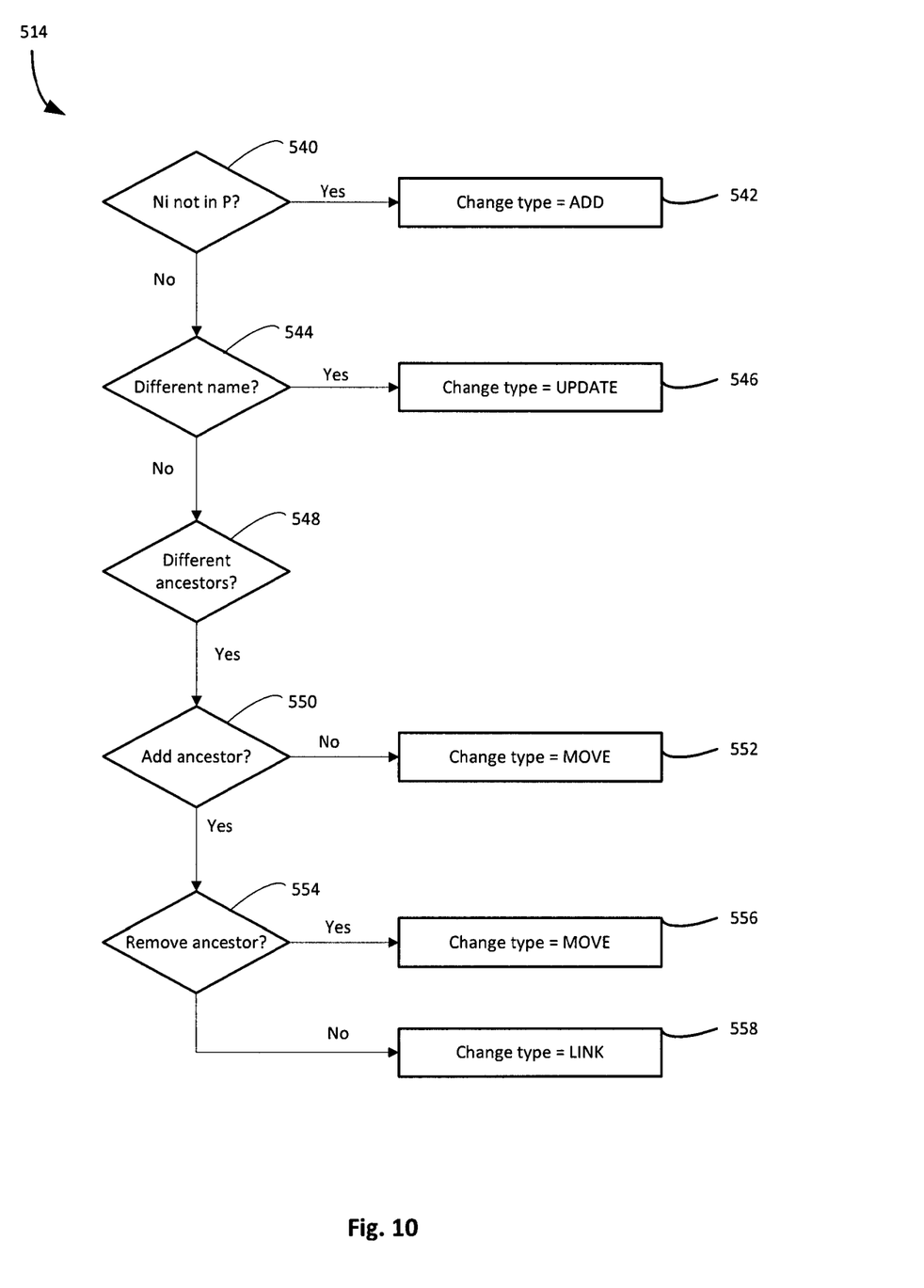
FIG. 10 is a flow chart illustrating further details of the flow chart shown in FIG. 9.

Referring to FIG. 10, the analysis step 514 is illustrated in more detail. The analysis step 514 produces pairs that identify the object and its change type. In general, all of the first set of pairs $(N_1, P), (N_2, P) \ldots (N_k, P)$ are processed to find new and changed objects, whereas all of the second set of pairs $(P_1, N), (P_2, N) \ldots (P_k, N)$ are processed to find deleted objects. There can be multiple pairs of changes generated for a single object. For instance, an object might be renamed and then moved to another location.

In step 540, if an object from subset $N_i$ is not found in the previous snapshot P based on the object ID, then in step 542, it is identified as a new object and the change type is ADD.

If an object from subset $N_i$ is found in the previous snapshot P in step 540, and it has a different name in step 544 as compared to the same object in snapshot P, then the change type is identified as UPDATE in step 546. If the object does not have a different name in step 544, then consider whether the object has one or more different ancestors in step 548. If so, then consider whether an ancestor has been added in step 550. If not, then the change type is identified as MOVE in step 552. If an ancestor has not been added in step 550, then consider whether an ancestor has been removed in step 554. If so, then the change type is identified as MOVE in step 556. If not, then the change type is identified as LINK in step 558.

The process to find deleted objects from the second set of pairs $(P_1, N), (P_2, N) \ldots (P_l, N)$ is simple—if an object from subset $P_i$ is not found in snapshot N based on its object ID, then the object was deleted.

The calculation of changes in the file sharing and synchronization system is simple when using the Syncplicity platform. The connector agent returns a news feed which describes events that occurred after the specified date and recorded during the latest synchronization cycle. Since multiple events may happen with the same object, they need to be filtered as follows: (i) if the first event for the object was added, leave only the added event; (ii) if the latest event for the object was deleted, leave only deleted event; (iii) if an object was edited multiple times, leave only the latest edited event; and (iv) if an object was modified with any two of the following three actions—move, edit, rename and edit—both events must be processed. The result is a set of added, deleted, updated, moved and renamed events that need to be synchronized from the sharing/sync service.

If a repository object is mapped to multiple objects within the same shared folder in the sharing/sync service, then the changes made in the sharing/sync service to one of the object's representations will be synched back to all other representations during the next synchronization cycle.

After analyzing and calculating changes, they will be applied to the objects graph with the following exceptions: (i) If object to be deleted is not in the graph, ignore the change; (ii) If object to be added is already in the graph, ignore the change; (iii) If object to be updated has the same content version as in the database, ignore the change. However, since the same repository object may be mapped onto multiple instances in the sharing/sync service within the same Share (i.e., that object is linked to multiple locations in repository), all mappings need to be checked because some of them might not be updated (for instance, one of object instances was changed in the sharing/sync service but other instances were not updated since from the perspective of the sharing/sync service they are different objects); (iv) If the object to be updated has the same ancestors, ignore the change; and (v) If the object to be updated has the same name, ignore the change.

There are two primary reasons for the above exceptions: (1) an object was updated in the repository during the previous sync cycle, but in the next sync cycle, during the comparison of snapshots, that change would be discovered and returned as a new change; however, it does not need to be synched back to the original storage; and (2) in the case where the snapshot or news feed date is not saved, in the next synch cycle, the same events will be returned again but should not be re-synched.

The subject matter described herein may be computer-implemented in a suitable system by providing computer-executable instructions stored on a non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic energy, radio frequency signals, acoustic or light waves, such as those generated during radio wave and infrared data communications.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery. A computer software product may be an independent application with data input and data display modules. Alternatively, computer software products may be classes that are instantiated as distributed objects, or component software such as Java Beans or Enterprise Java Beans (both by Oracle Corporation). In one embodiment, the subject matter described herein is embodied as a computer program product which stores instructions, such as computer code, that when executed by a computer cause the computer to perform the processes and/or techniques described below.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for sharing and synchronizing changed content between a content repository and a single-user file sharing service, comprising:
    identifying, with a connector agent coupled between a content repository and a single-user file sharing service, a plurality of mappings corresponding to a plurality of objects that are synchronized between the content repository and the single-user file sharing service, each of the plurality of mappings representing a pairing of an object from the content repository with a corresponding object from the single-user file sharing service;
    analyzing, with the connector agent in a plurality of parallel threads, changes to at least some of the plurality of objects shared between the content repository and the single-user file sharing service;
    generating a plurality of tasks for synchronizing changes to the at least some of the plurality of objects shared between the content repository and the single-user file sharing service; and
    executing the plurality of tasks in parallel in a plurality of task engines.

2. The method of claim 1, wherein analyzing changes to at least some of the plurality of objects shared between the content repository and the single-user file sharing service comprises:
    comparing, with the connector agent, a new snapshot of the content repository to a prior snapshot of the content repository; and
    identifying, with the connector agent, based on the comparing step, the at least some of the plurality of objects that are changed and a corresponding type of change for each changed object.

3. The method of claim 2, wherein comparing the new snapshot of the content repository to the prior snapshot of the content repository comprises:
    dividing the new snapshot into a plurality of smaller new snapshots;
    pairing each of the plurality of smaller new snapshots with the prior snapshot;
    comparing the pairs of smaller new snapshots with the prior snapshot to identify new and changed objects;
    dividing the prior snapshot into a plurality of smaller prior snapshots;
    pairing each of the plurality of smaller prior snapshots with the new snapshot; and
    comparing the pairs of smaller prior snapshots with the new snapshot to identify deleted objects.

4. The method of claim 3, wherein comparing the pairs of smaller new snapshots with the prior snapshot comprises: identifying a corresponding change type as adding an object if the object is absent from the prior snapshot.

5. The method of claim 3, wherein comparing the pairs of smaller new snapshots with the prior snapshot comprises: identifying a corresponding change type as updating an object if the object is in the prior snapshot and has a different object name in the prior snapshot from the corresponding object name in a smaller new snapshot.

6. The method of claim 3, wherein comparing the pairs of smaller new snapshots with the prior snapshot comprises: identifying a corresponding change type as moving an object if the object has an ancestor in a smaller new snapshot that the object lacks in the prior snapshot without the ancestor being added in the new smaller snapshot.

7. The method of claim 3, wherein comparing the pairs of smaller new snapshots with the prior snapshot comprises:

identifying a corresponding change type as linking an object if the object is in the prior snapshot and has added an ancestor.

8. The method of claim 3, wherein comparing the pairs of smaller new snapshots with the prior snapshot comprises: identifying a corresponding change type as deleting an object if the object is in a smaller prior snapshot and absent from the new snapshot.

9. A computer program product, comprising a non-transitory computer-readable storage medium encoded with executable instructions for sharing and synchronizing changed content between a content repository and a single-user file sharing service, the instructions comprising:
   identifying, with a connector agent coupled between a content repository and a single-user file sharing service, a plurality of mappings corresponding to a plurality of objects that are synchronized between the content repository and the single-user file sharing service, each of the plurality of mappings representing a pairing of an object from the content repository with a corresponding object from the single-user file sharing service;
   analyzing, with the connector agent in a plurality of parallel threads, changes to at least some of the plurality of objects shared between the content repository and the single-user file sharing service;
   generating a plurality of tasks for synchronizing changes to the at least some of the plurality of objects shared between the content repository and the single-user file sharing service; and
   executing the plurality of tasks in parallel in a plurality of task engines.

10. The computer program product of claim 9, wherein analyzing changes to at least some of the plurality of objects shared between the content repository and the single-user file sharing service comprises:
   comparing, with the connector agent, a new snapshot of the content repository to a prior snapshot of the content repository; and
   identifying, with the connector agent, based on the comparing step, the at least some of the plurality of objects that are changed and a corresponding type of change for each changed object.

11. The computer program product of claim 10, wherein comparing the new snapshot of the content repository to the prior snapshot of the content repository comprises:
   dividing the new snapshot into a plurality of smaller new snapshots;
   pairing each of the plurality of smaller new snapshots with the prior snapshot;
   comparing the pairs of smaller new snapshots with the prior snapshot to identify new and changed objects;
   dividing the prior snapshot into a plurality of smaller prior snapshots;
   pairing each of the plurality of smaller prior snapshots with the new snapshot; and
   comparing the pairs of smaller prior snapshots with the new snapshot to identify deleted objects.

12. The computer program product of claim 11, wherein comparing the pairs of smaller new snapshots with the prior snapshot comprises: identifying a corresponding change type as adding an object if the object is absent from the prior snapshot.

13. The computer program product of claim 11, wherein comparing the pairs of smaller new snapshots with the prior snapshot comprises: identifying a corresponding change type as updating an object if the object is in the prior snapshot and has a different object name in the prior snapshot from the corresponding object name in a smaller new snapshot.

14. The computer program product of claim 11, wherein comparing the pairs of smaller new snapshots with the prior snapshot comprises: identifying a corresponding change type as moving an object if the object has an ancestor in a smaller new snapshot that the object lacks in the prior snapshot without the ancestor being added in the new smaller snapshot.

15. The computer program product of claim 11, wherein comparing the pairs of smaller new snapshots with the prior snapshot comprises: identifying a corresponding change type as linking an object if the object is in the prior snapshot and has added an ancestor.

16. The computer program product of claim 11, wherein comparing the pairs of smaller new snapshots with the prior snapshot comprises: identifying a corresponding change type as deleting an object if the object is in the smaller prior snapshot and absent from the new snapshot.

17. A system for sharing and synchronizing changed content between a content repository and a single-user file sharing service, the system comprising:
   a processor-based application executed on a computer and configured to:
      identify, with a connector agent coupled between a content repository and a single-user file sharing service, a plurality of mappings corresponding to a plurality of objects that are synchronized between the content repository and the single-user file sharing service, each of the plurality of mappings representing a pairing of an object from the content repository with a corresponding object from the single-user file sharing service;
      analyze, with the connector agent in a plurality of parallel threads, changes to at least some of the plurality of objects shared between the content repository and the single-user file sharing service;
      generate a plurality of tasks for synchronizing changes to the at least some of the plurality of objects shared between the content repository and the single-user file sharing service; and
      execute the plurality of tasks in parallel in a plurality of task engines.

18. The system of claim 17, wherein analyzing changes to at least some of the plurality of objects shared between the content repository and the single-user file sharing service comprises:
   comparing a new snapshot of the content repository to a prior snapshot of the content repository; and
   identifying, based on the comparing step, the at least some of the plurality of objects that are changed and a corresponding type of change for each changed object.

19. The system of claim 17, wherein comparing the new snapshot of the content repository to the prior snapshot of the content repository comprises:
   dividing the new snapshot into a plurality of smaller new snapshots;
   pairing each of the plurality of smaller new snapshots with the prior snapshot;
   comparing the pairs of smaller new snapshots with the prior snapshot to identify new and changed objects;
   dividing the prior snapshot into a plurality of smaller prior snapshots;
   pair each of the plurality of smaller prior snapshots with the new snapshot; and comparing the pairs of smaller prior snapshots with the new snapshot to identify deleted objects.

20. The system of claim 17, wherein the processor-based application is further configured to:
- save the at least some of the plurality of objects and a corresponding change type for each changed object into a hash table; and
- synchronize the at least some of the plurality of objects in at least one of the content repository and the single-user file sharing service.

* * * * *